United States Patent

Pattano

[11] Patent Number: 5,181,887
[45] Date of Patent: Jan. 26, 1993

[54] AUTOMATICALLY REGULATED BELT STRETCHING DEVICE

[75] Inventor: Pietro Pattano, Villa Cortese, Italy

[73] Assignee: Fiat Auto S.P.A., Turin, Italy

[21] Appl. No.: 781,381

[22] Filed: Oct. 23, 1991

[30] Foreign Application Priority Data

Oct. 24, 1990 [IT] Italy ................ 21857 A/90

[51] Int. Cl.⁵ .............................. F16H 7/12
[52] U.S. Cl. .................... 474/101; 474/138
[58] Field of Search .......... 474/138, 136, 114, 115, 474/117, 139, 102, 101

[56] References Cited

U.S. PATENT DOCUMENTS

| | | | |
|---|---|---|---|
| 2,167,963 | 8/1939 | Webb | 474/138 |
| 4,151,756 | 5/1979 | Binder et al. | 474/138 |
| 4,411,638 | 10/1983 | Wilson | 474/138 |
| 4,813,915 | 3/1989 | Kotzab | 474/135 X |

FOREIGN PATENT DOCUMENTS

| | | | |
|---|---|---|---|
| 467888 | 9/1950 | Canada | 474/117 |
| 329855 | 8/1989 | European Pat. Off. | 474/138 |
| 3643814 | 6/1988 | Fed. Rep. of Germany | |
| 2058815 | 5/1971 | France | |
| 2320470 | 3/1977 | France | |
| 2135017 | 8/1984 | United Kingdom | 474/138 |

Primary Examiner—Ramon S. Britts
Assistant Examiner—Roger J. Schoeppel
Attorney, Agent, or Firm—Cushman, Darby & Cushman

[57] ABSTRACT

An engine equipped with driving belts is provided with an automatically regulated belt-stretching device, arranged in the vicinity of one belt, mounted on a support fixed to the engine. The device includes a pin extending from the support and defining a longitudinal axis, the pin being provided with a pair of shoulders at a distance from one another, between which two bushings are inserted. The bushings are adaped to define, together with the pin, a pair of housings. Springs capable of displacing the bushings relative to the shoulders and to the longitudinal axis of the pin are housed in the respective housings. A bearing which rotates in contact with one belt is provided on the outer surface of each bushing.

9 Claims, 2 Drawing Sheets

AUTOMATICALLY REGULATED BELT STRETCHING DEVICE

BACKGROUND OF THE DISCLOSURE

This invention relates to an automatically regulated belt stretching device.

It is known that the transmission of motion from the drive shaft to the cam shafts is effected by means of cogged belts manufactured in such a way that after an initial permanent set, they become virtually nondeformable.

The engine casings produced today are manufactured from light aluminium alloys having a high coefficient of thermal expansion.

Consequently, during the operation of an engine and as a result of the variations in temperature to which the engine is subjected, there are considerable variations in the distance between the centres of the shafts on which the belt operates.

These variations occur as the engine passes from a heating phase to a temperature control phase and then to the cooling phase following stoppage of the engine. These variations then lead to substantial changes with respect to the initial tension of the belt and thus to disadvantages during the operation thereof, such as noise and excessive or insufficient tension.

Hydraulically operated stretchers using the engine oil are known, which, in spite of the accuracy of assembly and construction, may have operating defects, such as oil losses, noise, possible seizure and high costs.

SUMMARY OF THE INVENTION

The object of this invention is to propose a belt-stretching device of a simple construction, the operation of which does not require pressurised fluids and complex moving components, such as levers and springs, but which can nevertheless obviate the disadvantages of the known prior art.

This problem is solved in the case of an engine equipped with driving belts in that an automatically regulated belt-stretching device, arranged in the vicinity of one belt, is mounted on a support fixed to the engine, the device being characterised in that it comprises a pin extending from the support and defining a longitudinal axis, the pin being provided with a pair of shoulders at a distance from one another, between which two bushings are inserted, the bushings being adapted to define, together with the pin, a pair of housings, elastic means capable of displacing the bushings relative to the shoulders and to the longitudinal axis of the pin being housed therein, the bushings, moreover, on their outer surfaces with respect to the housings, having a bearing in contact with a flat surface of the one belt.

According to this invention, the device is thermally coupled to the engine by means of the support, the support transmitting heat to the elastic means.

In particular, the elastic means consist of a plurality of leaf springs forming a group in each of the housings. The leaf springs according to this invention are of the type having form storage as a function of the temperature reached.

In a preferred embodiment according to this invention, each group of leaf springs consists of four springs. Sealing means are provided in an end portion of the shoulders, between these shoulders and the bushings. The pin, between the shoulders and in correspondence with the bushings, has a square section and the shoulders, the bushings and the elastic means are held on the pin by means of a nut engaged in a threaded end portion of the pin.

BRIEF DESCRIPTION OF THE DRAWINGS

The features and further advantages of this invention will be clear from the following description, which is given by way of a non-limiting example, with reference to the accompanying drawings, in which.

DETAILED DESCRIPTION

Figure 1:
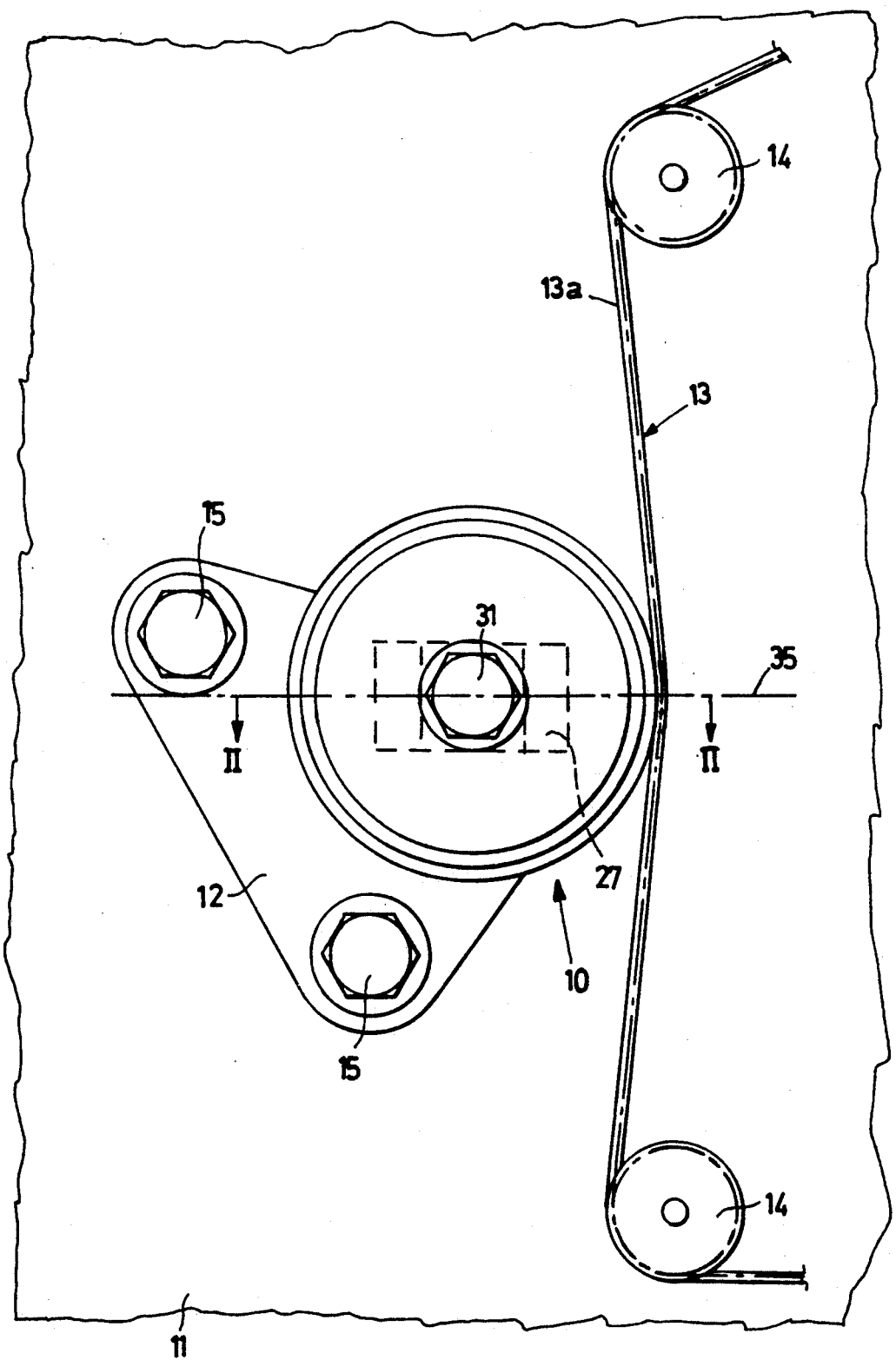
FIG. 1 is a plan view of a device according to the invention in contact with part of the driving belt of an engine.

With reference to the drawings, a belt-stretching device according to the invention is designated in general by the reference numeral 10, the device 10 being fixed to an engine 11 by means of a support 12. The device 10 is mounted in the vicinity of a belt 13 driven by pulleys 14. The belt can be of the type having a V shaped or cogged section and in any case defines its one smooth surface 13a. As already stated, the device 10 consists of the support 12, fixed to the engine by means of appropriate bolts 15, a pin 16 extending vertically from the support and defining a longitudinal axis 17, a first portion 18, an intermediate portion having a square section 19 and an end threaded portion 20 on to which a nut 31 can be screwed.

The pin 16 is provided with a pair of shoulders 21 and 22, spaced at a distance from the intermediate portion 19 of the pin. Two bushings 23 are inserted between this pair of shoulders on opposite sides of the intermediate portion of the pin 16 having a square section 19, in such a way that they can be displaced. Sealing elements 24 are provided between the bushings 23 and the shoulders 21 and 22, both at the top and at the bottom.

The bushings 23 have a bearing 25, the outer surface 26 of which is smooth and is in contact with the flat surface of the belt 13.

Figure 2:
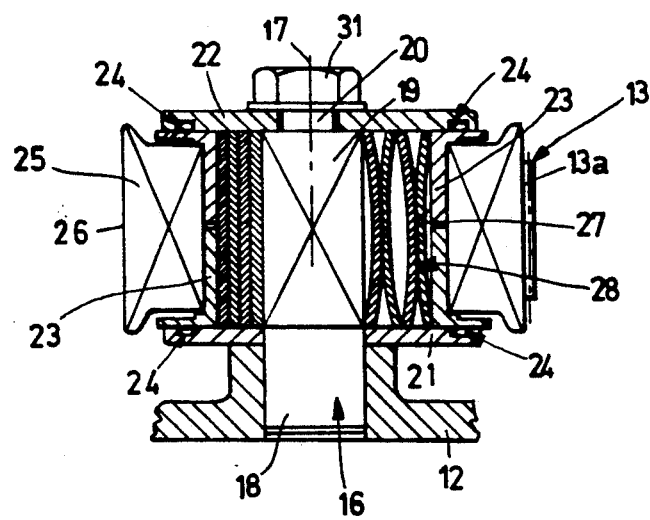
FIG. 2 is a section along the line II—II of FIG. 1.

In addition to defining the section of FIG. 2, the line II—II of FIG. 1 represents an axis 35 along which the centre of rotation of the bearing 25 is displaced. The belt 13 is preferably in contact with the bearing tangentially in correspondence with or in the vicinity of this axis 35.

The shoulders 21 and 22 and the bushings 23 define at either side housings 27 between which springs 28 having substantially the shape of a plate and being of the type having form storage as a function of the temperature reached are inserted. The elements are held on the pin by the nut 21 and the pin is fixed to the support 12.

The device 10 according to this invention can be thermally coupled to the engine by means of the support 12 and can transmit heat from the engine to the form storage springs 28. Depending on the temperature reached, the springs assume various configurations, shown in FIGS. 3, 4 and 5.

Figure 3:
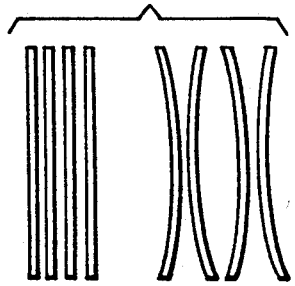
FIGS. 3, 4 & 5 show details from FIG. 2 in different arrangements.
Figure 4:
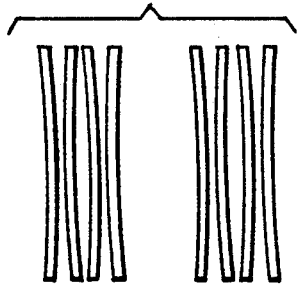
Figure 5:
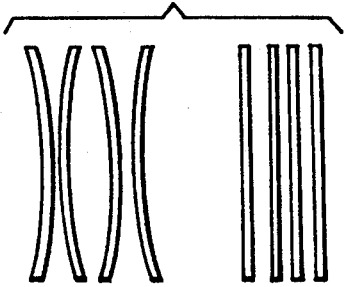

In a preferred embodiment according to this invention, four springs having form storage are inserted into each housing 27, FIG. 3 showing an arrangement with hypothetical temperatures of less than 0° C., FIG. 4 showing an arrangement with hypothetical temperatures of between 0° and 20°, and FIG. 5 showing the arrangement of the same springs at the operative temperature (warm engine 60°-100° C.).

By virtue of this belt stretcher, which is completely free of any hydraulic connections and which therefore does not use any pressurised fluid, the displacement of the bearing 25 can be effected by means of the stresses applied to one or both of the bushings 23 by the springs 28 having form storage (i.e., predetermined temperature-dependent shape).

According to the changes in the arrangement of the form storage springs, the centre of rotation of the bearing 25 is displaced along the axis 35 and with respect to the longitudinal axis 17 (normal to the axis 35) of the pin 16, thereby allowing the bearing to transmit more or less stress to the flat surface 13a of the belt according to the temperature reached by the engine and therefore according to the expansion it undergoes.

The elastic characteristics of the form storage springs according to this invention are in any case sufficient to apply satisfactory tension to the belts used at present, resulting overall in a device which is reliable, of simple construction and economically advantageous.

I claim:

1. An engine temperature-regulated belt tensioner for an engine which, in normal expected use, heats up to an operating temperature from a lower ambient temperature during an initial period of operation, and which engine is associated with a driven endless belt that is entrained about a plurality of pulleys so as to advance along a path which includes a path segment between two such pulleys, within which path segment the belt is located adjacent the engine, said belt tensioner comprising:

a heat-conductive support arranged to be fixed to the engine beside said path segment;

a heat-conductive pin mounted on said support so as to have a longitudinal axis thereof extending transversally of said path and parallel to axes of rotation of said two pulleys;

a first nonrotary, annular end flange provided about said pin adjacent said support, for defining a substantially stationary, radially extending, axially facing first shoulder on said pin;

a second nonrotary, annular end flange provided about said pin more distally of said support than said first end flange, said second end flange being axially spaced along said longitudinal axis of said pin from said first end flange and defining a substantially stationary, radially extending, axially facing second shoulder on said pin;

said first and second shoulders being disposed to confront one another with axially spacing between them along said longitudinal axis;

an annular bushing means radially spacedly encircling said pin between said first and second shoulders and being effectively supported on axially opposite ends thereof by said shoulders for limited lateral shifting transversally of said longitudinal axis;

annular bearing means including a first annular portion engagingly supported by said annular bushing means for limited lateral shifting movement therewith and a second annular portion which is rotatably supported on said first annular portion for lateral shifting movement therewith and for rotation about an axis which is substantially parallel to or concident with said longitudinal axis, said second annular portion having a radially outer, radially outwardly presented surface arranged to be disposed along a segment thereof in belt-tensioning rolling engagement with said driven endless belt within said path segment; and thermally responsive resilient means housed axially between said shoulders in two diametrically opposed sets each such set being engaged between said pin and said bushing means, and arranged to thermally dependently laterally shiftably support said bushing means relative to said pin for limited lateral movement along an axis which is transverse to said longitudinal axis and transverse to said path segment, for varying deflection of said belt in said path segment in proportion to variation in temperature of said engine between said ambient temperature and said operating temperature.

2. The engine temperature-regulated belt tensioner of claim 1, wherein:

each said set of thermally responsive resilient means comprises a plurality of leaf springs each of which changes in relative flatness compared to curvature, due to changes in temperature between said ambient temperature and said operating temperature, the leaf springs in each set being disposed in respective series of facially confronting leaf springs.

3. The engine temperature-regulated belt tensioner of claim 2, wherein:

said pin, axially between said shoulders, is provided with two diametrically opposed flat sides, each of which is presented in facially confronting engaging relation with a leaf spring of a respective said set.

4. The engine temperature-regulated belt tensioner of claim 2, wherein:

each said set is constituted by four said leaf springs.

5. The engine temperature-regulated belt tensioner of claim 2, wherein:

at said ambient temperature, all of said leaf springs in one of said sets are flatter than all of said leaf springs in the other of said sets and at said operating temperature, all of said leaf springs in said one set are more curved than all of said springs in said other set.

6. The engine temperature-regulated belt tensioner of claim 5, wherein:

said pin, axially between said shoulders, is provided with two diametrically opposed flat sides, each of which is presented in facially confronting engaging relation with a leaf spring of a respective said set.

7. The engine temperature-regulated belt tensioner of claim 1, further comprising:

annular sealing means generally coaxially provided between each said annular end flange and a respective axial end of said annular bushing means.

8. The engine temperature-regulated belt tensioner of claim 7, wherein:

each said annular sealing means comprises an annular sealing ring received in an annular groove formed in a respective said shoulder radially outwardly beyond said sets of thermally responsive resilient means.

9. The engine temperature-regulated belt tensioner of claim 8, further comprising:

a nut removably threaded onto said pin axially beyond said second nonrotary, annular end flange for maintaining said annular bushing means sandwiched axially between said first and second nonrotary, annular end flanges.

* * * * *